(12) United States Patent
Masters

(10) Patent No.: US 10,209,946 B2
(45) Date of Patent: Feb. 19, 2019

(54) AUGMENTED REALITY PERSONAL IDENTIFICATION

(75) Inventor: Jon Masters, Cambridge, MA (US)

(73) Assignee: Red Hat, Inc., Raleigh, NC (US)

( * ) Notice: Subject to any disclaimer, the term of this patent is extended or adjusted under 35 U.S.C. 154(b) by 284 days.

(21) Appl. No.: 13/593,182

(22) Filed: Aug. 23, 2012

(65) Prior Publication Data

US 2014/0055488 A1    Feb. 27, 2014

(51) Int. Cl.
*G06F 3/147* (2006.01)
*G09G 5/377* (2006.01)

(52) U.S. Cl.
CPC ........... *G06F 3/147* (2013.01); *G09G 5/377* (2013.01); *G09G 2340/125* (2013.01); *G09G 2370/022* (2013.01); *G09G 2370/16* (2013.01)

(58) Field of Classification Search
CPC ......... A61M 5/20; A63H 27/12; G06K 19/16; G06K 2017/0045; G06K 7/0008; G06K 9/0067; G06Q 30/06; G06Q 30/0609; G06Q 30/0261; G06Q 10/0833; G06F 19/3456; G06F 19/327; G06F 1/1686; G06F 1/1694; G06F 2221/2151; G06F 2203/04805; G01V 11/002; G02B 2027/0178; G07C 9/0015; G09G 5/377; G09G 2320/0646; G09G 2320/0233; H04L 67/02; H04L 67/06; G06T 19/006; G06T 7/66; H03G 3/10; G01S 13/84; G01S 5/14; G01S 11/06; G01S 5/0226; H04B 1/7083; H04B 5/0062; H04B 3/1575; H04N 3/1575
USPC ........................................... 345/633
See application file for complete search history.

(56) References Cited

U.S. PATENT DOCUMENTS

| | | | |
|---|---|---|---|
| 7,920,158 B1* | 4/2011 | Beck | H04N 5/23219 348/14.08 |
| 8,352,296 B2* | 1/2013 | Taneja et al. | 705/5 |
| 2010/0066503 A1* | 3/2010 | Rhie | G01S 1/68 340/10.1 |
| 2010/0302143 A1* | 12/2010 | Spivack | 345/157 |
| 2011/0246276 A1* | 10/2011 | Peters et al. | 705/14.24 |
| 2012/0019557 A1* | 1/2012 | Aronsson | G06T 11/00 345/633 |

OTHER PUBLICATIONS

Raju PP, "15 Stunning Augmented Reality Apps for iPhone", Oct. 21, 2009.

* cited by examiner

*Primary Examiner* — Gregory J Tryder
*Assistant Examiner* — Kwang Lee
(74) *Attorney, Agent, or Firm* — Lowenstein Sandler LLP

(57) ABSTRACT

An identification module receives an identification signal that uniquely identifies an individual and captures an image of the individual. The identification module determines tag information associated with the individual using the received identification signal and displays, to a user, the tag information overlayed on the image of the individual.

18 Claims, 9 Drawing Sheets

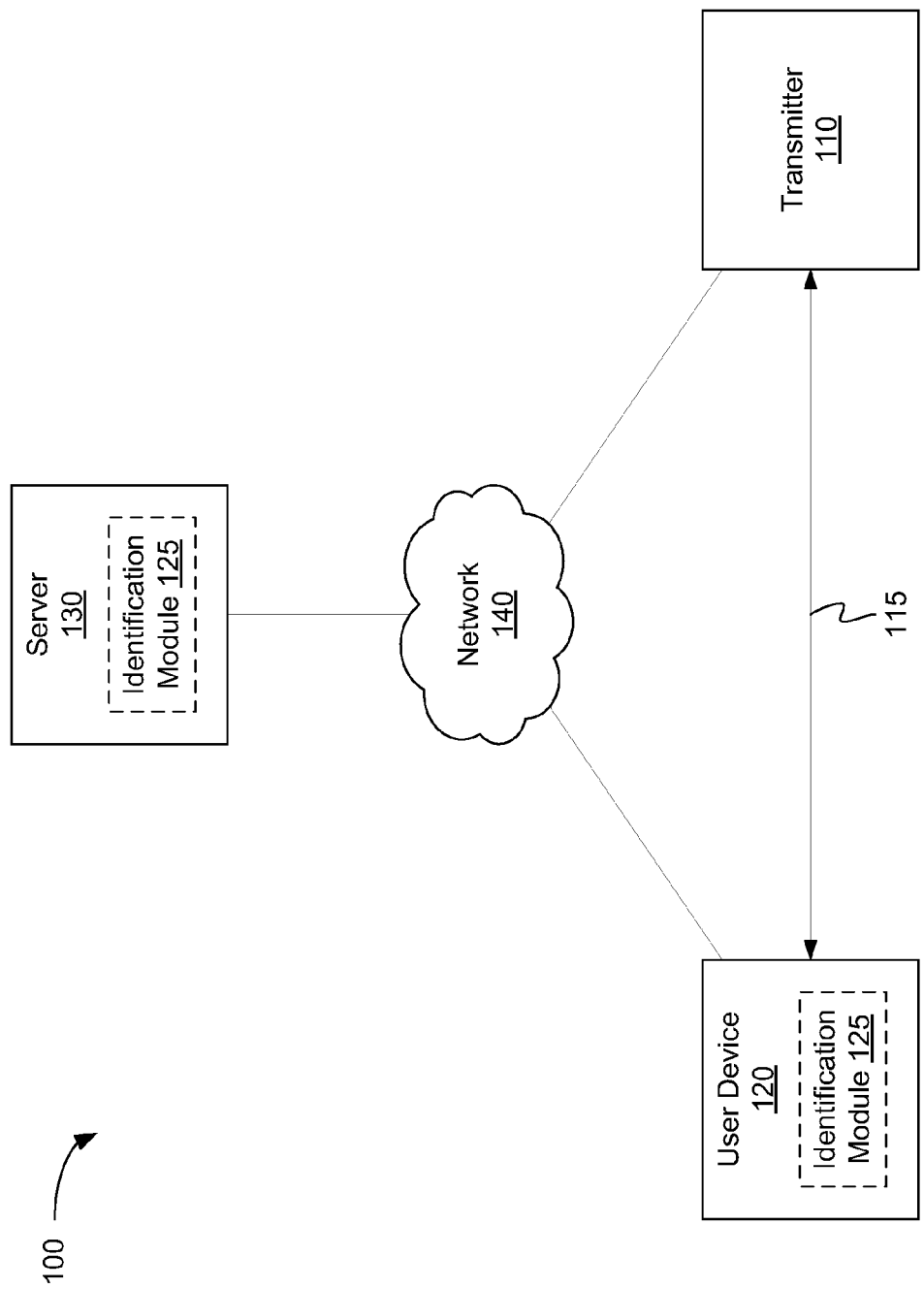

AUGMENTED REALITY PERSONAL IDENTIFICATION

TECHNICAL FIELD

This disclosure relates to the field of augmented reality and, in particular, to augmented reality personal identification.

BACKGROUND

In many situations where a person, or a group of people are gathered together, it may be helpful to identify who the person or people are. For example, at a conference or other gathering there may be a crowd of people, some of whom the user has met and some who are strangers. The user may recognize certain people, but have forgotten how they know those people or where they previously met. In another case, the user may have forgotten a person's name or where that person works. In some cases, the individuals at the conference or gathering may wear name tags or identification badges that display some identifying information, such as an individual's name and/or employer. In order for the identifying information on the name tags or badges to be obtained by the user, however, the user may have to visually inspect each individual name tag or badge. This may be time consuming, as the user would have to walk around from person to person. In the event that an individual is not displaying identifying information, the user may have to ask who the individual is or where they work, which may potentially be socially awkward.

BRIEF DESCRIPTION OF THE DRAWINGS

The present disclosure is illustrated by way of example, and not by way of limitation, in the figures of the accompanying drawings.

FIG. 1 is a block diagram illustrating a computing environment for augmented reality personal identification, according to an embodiment.

DETAILED DESCRIPTION

Figure 2A:
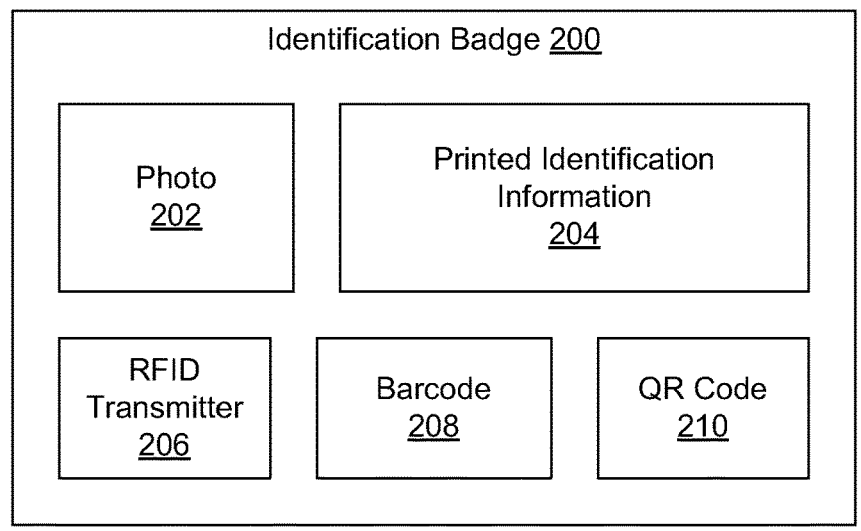
FIG. 2A is a block diagram illustrating an identification badge to transmit an identification signal, according to an embodiment.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments are described for augmented reality personal identification. In one embodiment, an identification module may identify one or more individuals in a scene, look up identifying information about the identified individuals, and display the identifying information on an image of the scene, adjacent to each of the identified individuals. In one embodiment, the image may be a still image captured at a previous point in time. In another embodiment, however, the image may be a live image that is continually updated in real-time as the scene changes. In this case, the displayed tags on the live image create an augmented reality. Augmented reality is a direct or indirect view of a physical, real-world environment or scene whose elements are augmented by computer-generated sensory input such as sound, video, graphics, etc. For example, the identifying information tags may be displayed adjacent to individuals in the scene. As a result, the technology functions by enhancing the user's current perception of reality.

In one embodiment, each of the individuals in the scene may have a transmitter that emits a unique identification signal that may be used to identify the particular individual. For example, each individual may have a name tag or identification badge containing a radio-frequency identification (RFID) transmitter that emits a unique RFID signal. In another embodiment, each individual may have a mobile telephone or other mobile device that emits a unique signal, such as Bluetooth signal, near field communication (NFC) signal, or mobile communications signal. These unique signals may be received by a receiver and used to uniquely identify the individuals associated with each signal.

In one embodiment, a user may have a user device, such as a smartphone or tablet computer, that can receive the identification signals from the various individuals. Based, for example, on the intensity or direction of the received signals, the user device may determine a position from which each signal originated. The user device may also capture an image of the scene, including the individuals associated with the received identification signals. The user device may perform some image processing to identify separate individuals in the image as well as their relative locations. Alternatively, the user device may send the received signals and captured image to a separate server or other device for position processing. The user device or server may correlate the positions of the received signals and identified individuals in the image to associate the identification signals with certain individuals. The user device or server may consult a repository of tag information to retrieve information associated with the identified individuals. The user device may overlay all or part of this tag information on the captured image or on a live image to create an augmented reality. The user may thus be able to view identifying information about the individuals in the scene.

The augmented reality personal identification techniques described herein allow a user to quickly and easily identify one or more individuals in a scene. The user is provided with identifying information such as a person's name, employer, title, contact information, scheduling availability, etc. This may prevent the user from having to walk around from person to person to visually inspect each individual name tag or badge or ask each individual who they are or where they work. This can save significant time and effort, as compared to conventional techniques.

FIG. 1 is a block diagram illustrating a computing environment for augmented reality personal identification, according to an embodiment of the present invention. In one embodiment, network environment 100 includes transmitter 110, user device 120, and server 130. Transmitter 110, user device 120, server 130 may be connected through a series of one or more networks 140, which may be, for example, a local area network (LAN), a wide area network (WAN), a global area network (GAN) such as the Internet, or a combination of such networks. In another embodiment, transmitter 110, user device 120, and server 130 may have a direct connection to each of the other devices in the network, such as the wireless connection 115 between transmitter 110 and user device 120. The illustrated embodiment shows one transmitter 110, user device 120, and server 130, however, in other embodiments, there may be any number of transmitters, user devices, and servers, and environment 100 may include additional and/or different devices.

In one embodiment, transmitter 110 emits a unique identification signal that may be used to identify a particular individual. For example, transmitter 110 may be a radio-frequency identification (RFID) transmitter, contained in a name tag or identification badge, that emits a unique RFID signal. In another embodiment, each individual may have a mobile telephone or other mobile device that emits a unique signal, such as Bluetooth signal, near field communication (NFC) signal, or mobile communications signal. In other embodiments, transmitter 110 may emit some other type of identification signal. These unique signals may be used to uniquely identify the individual associated with transmitter 110.

User device 120 may be, for example, a personal computer (PC), workstation, laptop computer, tablet computer, mobile phone, personal digital assistant (PDA) or the like. In one embodiment, user device 120 includes a receiver to receive the identification signal from transmitter 110 (e.g., over wireless connection 115). User device 120 may additionally include a camera to capture an image, such as a still image or real-time image, of a scene. Additionally, in one embodiment, user device 120 may include identification module 125. Identification module 125 may interpret the received identification signal from transmitter 110, and based, for example, on the intensity or direction of the received signal, determine a position from which the signal originated (i.e., a position of the transmitter 110). Identification module 125 may also perform image processing on the captured image to identify separate individuals in the image as well as their relative locations. Identification module 125 may correlate the positions of the received signal and identified individuals in the image to associate the identification signal with a certain individual. Identification module 125 may consult a repository (e.g., stored by server 130) of tag information to retrieve information associated with the identified individual. Identification module may overlay all or part of this tag information on the captured image or on a live image to create an augmented reality, which is displayed to the user of user device 120. Identification module 125 is described in further detail below.

Server 130 may be any computing device, such as computing system 900, described below with respect to FIG. 9. In one embodiment, server 130 may be a server, or other computer, operated by a third party. In one embodiment, server 130 may include identification module 125 to perform the operations discussed above in place of user device 120. For example, if user device 120 lacks the resources or is otherwise engaged, server 130 may perform the positioning and correlation operations. Server 130 may also include a repository of tag information, which identification module 125 can access based on the received identification signals. This repository is described in further detail below.

Figure 2B:
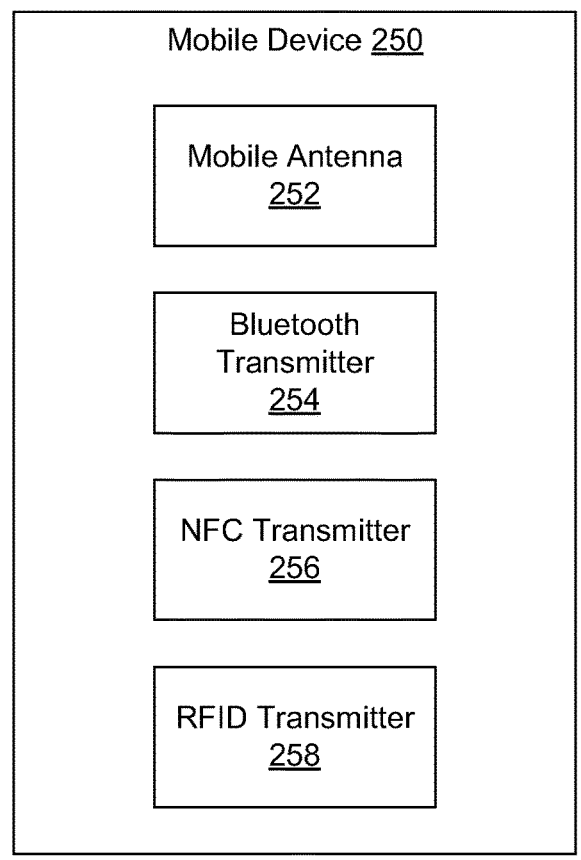
FIG. 2B is a block diagram illustrating a mobile device to transmit an identification signal, according to an embodiment.

FIGS. 2A and 2B are block diagrams illustrating an identification badge and a mobile device respectively, each to transmit an identification signal, according to an embodiment of the present invention. Referring to FIG. 2A, in one embodiment, identification badge 200 may include a transmitter, such as transmitter 110, to emit an identification signal. For example, at a conference or other event, each individual in attendance may be given an identification badge 200 to be worn on their clothing or otherwise kept on their person. In one embodiment, identification badge 200 may have certain identifying information on its surface, such as a photo 202 of the individual and/or printed identification information 204, which may include for example, the individual's name, employer, title, etc. In one embodiment, identification badge 200 may also include a transmitter 206, such as an RFID transmitter or other transmitter. Transmitter 206 may emit a unique identification signal that can be used to identify the individual to whom the identification badge 200 is assigned. In other embodiments, identification badge 200 may include some other type of signal transmitter besides an RFID transmitter.

In one embodiment, rather than emit an identification signal, identification badge 200 may present the identifying information in an optical form. For example, identification badge 200 may include a barcode 208 or quick response (QR) code 210, that when viewed or scanned by a device, such as user device 120, conveys the same or similar identifying information as the identification signal emitted by transmitter 206. In other embodiments, identification badge 200 may include some combination of one or more of RFID transmitter 206, barcode 208, and QR code 210.

Referring to FIG. 2B, in one embodiment, mobile device 250 may include a transmitter, such as transmitter 110, to emit an identification signal. In a situation where it is not practical for each individual to have a dedicated identification badge, a mobile device 250 that each individual already carries (e.g., a smartphone) may be used to emit the identification signal. In one embodiment, mobile device 250 includes one or more transmitters capable of emitting an identification signal, such as mobile antenna 252, Bluetooth transmitter 254, NFC transmitter 256, RFID transmitter 258, or other transmitter. In one embodiment, one or more of these transmitters may emit a dedicated identification signal that can be used to identify an individual associated with the mobile device 250. In another embodiment, a non-dedicated signal may be used as the identification signal. For example, Bluetooth transmitter 254 may emit a signal, that while still unique to mobile device 250, can be used for other purposes besides identification of the mobile device 250 (e.g., connecting with wireless peripheral devices).

Figure 3:
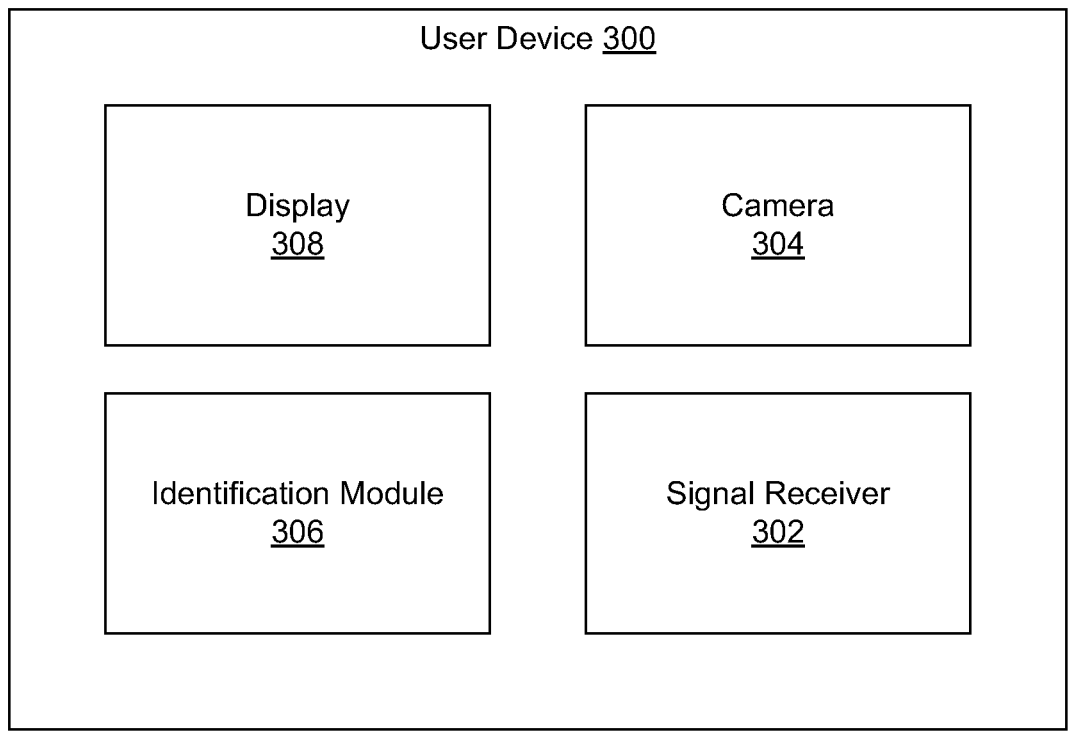
FIG. 3 is a block diagram illustrating a user device for augmented reality personal identification, according to an embodiment.

FIG. 3 is a block diagram illustrating a user device for augmented reality personal identification, according to an embodiment of the present invention. In one embodiment, user device 300 may be representative of user device 120, as shown in FIG. 1. In one embodiment, user device 300 includes signal receiver 302, camera 304, identification module 306 and display 308. User device 300 may be, for example, a personal computer (PC), workstation, laptop computer, tablet computer, mobile phone, personal digital assistant (PDA) or other similar device.

In one embodiment, signal receiver 302 receives the identification signal sent from transmitter 110. The identification signal may be received over a network 140 or over a direct wireless communication link 115 between the user device 300 and transmitter 110. In one embodiment, signal reviver 302 may be a wireless signal antenna to receive various types of communication signals such as an RFID signal, Bluetooth signal, NFC signal, or other signal. In another embodiment, signal receiver 302 may be an optical receiver capable of reading optical forms of communication, such as reading or scanning barcode 208 or QR code 210 from identification badge 200 or receiving an infrared (IF) or other optical signal from transmitter 110. In another embodiment, signal receiver 302 may be a facial recognition scanner that can scan either photo 202 or an individual's actual face to uniquely identify the individual. Signal receiver 302 may receive one or more identification signals from one or more transmitters and provide the signals to identification module 306.

In one embodiment, camera 304 captures an image of scene containing one or more individuals associated with the received identification signals. For example, the individuals may be holders of identification badge 200 or mobile device 250. In one embodiment, camera 304 may be a digital camera that captures video or still photographs by recording the images on an electronic image sensor. Camera 304 may capture the image of the scene and provide the image to identification module 306.

In one embodiment, identification module 306 may interpret the received identification signal from signal receiver 302, and based, for example, on the intensity or direction of the received signal, determine a position from which the signal originated (i.e., a position of the transmitter). Identification module 306 may also perform image processing on the captured image from camera 304 to identify separate individuals in the image, as well as their relative positions. Identification module 306 may correlate the positions of the received signal and identified individuals in the captured image to associate the identification signal with a certain individual. Identification module 306 may consult a repository (e.g., stored by server 130) of tag information to retrieve information associated with the identified individual. Identification module 306 may overlay all or part of this tag information on the captured image or on a live image to create an augmented reality, which may be displayed to the user on display 308. In another embodiment, rather than process identification signal and image, identification module 306 may send the raw data to server 130 for processing.

Figure 4:
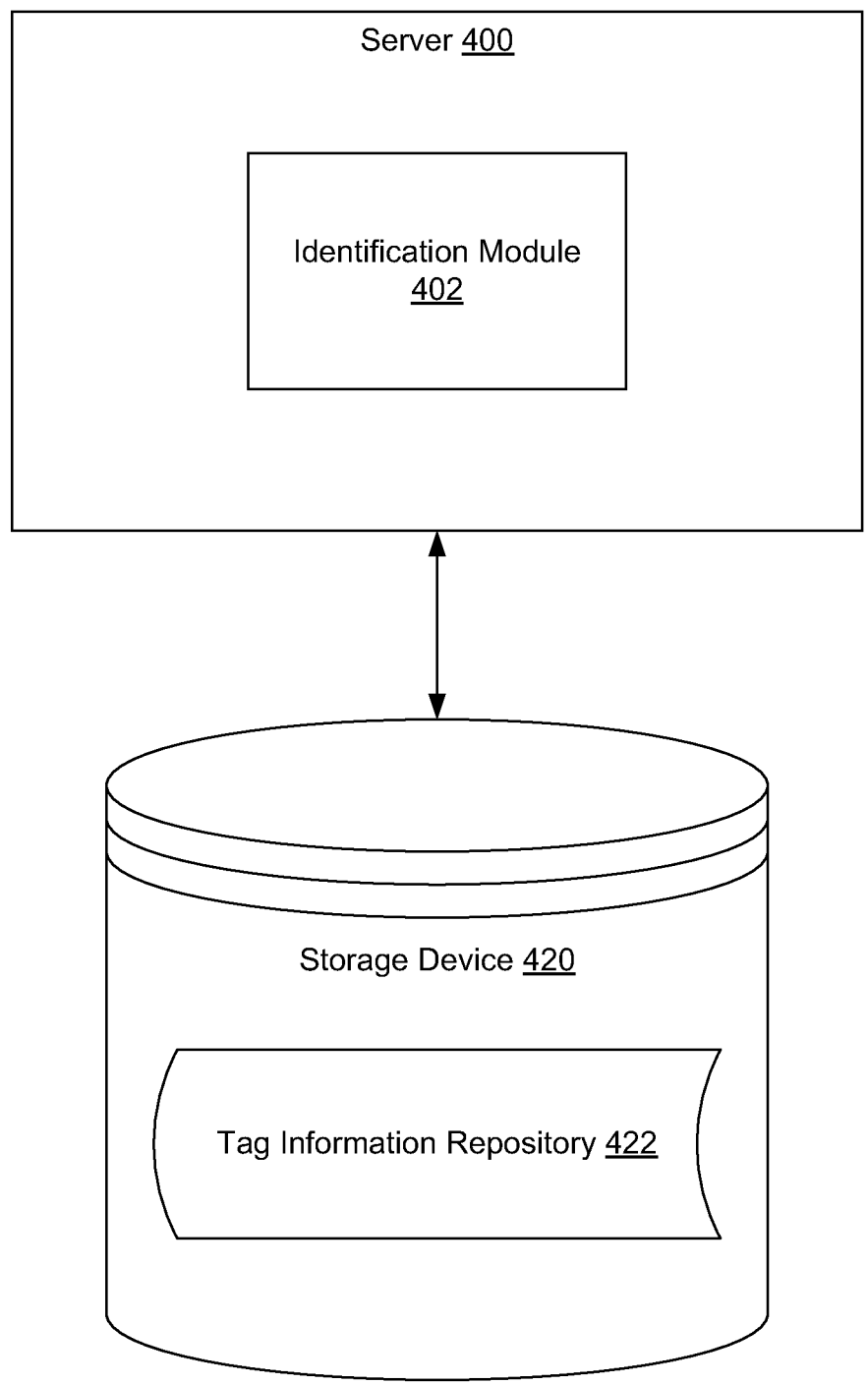
FIG. 4 is a block diagram illustrating a server for augmented reality personal identification, according to an embodiment.

FIG. 4 is a block diagram illustrating a server for augmented reality personal identification, according to an embodiment of the present invention. In one embodiment, server 400 may be representative of server 130, as shown in FIG. 1. In one embodiment, server 400 includes identification module 402. Identification module 402 may perform the same or similar functions as identification modules 125 and 306, discussed above. Server 400 may include or be coupled to a storage device 420 which includes tag information repository 422. Storage device 420 may be part of computing device 400 or may be part of another device in network environment 100 and may be, for example, memory, such as read-only memory (ROM), flash memory, random access memory (RAM), etc., or a mass storage device, such as a magnetic or optical storage device.

In one embodiment, identification module 402 may receive an identification signal and captured image from user device 300 and interpret the received identification signal, and determine a position from which the signal originated (i.e., a position of the transmitter) based, for example, on the intensity or direction of the received signal. Identification module 402 may also perform image processing on the received image to identify separate individuals in the image, as well as their relative positions. Identification module 402 may correlate the positions of the received signal and identified individuals in the captured image to associate the identification signal with a certain individual. In one embodiment, in response to a request from user device 300 or in response to correlating the positions, identification module 402 may consult tag information repository 422 on storage device 420 to retrieve information associated with the identified individuals. Tag information repository 422 may include a series of entries, indexed by the identification information contained in the identification signal. Each entry may include tag information associated with a particular individual, such as name, employer, title, contact information, scheduling information or other information. Identification module 402 may retrieve this tag information from tag information repository 422 and return it to user device 300.

Figure 5:
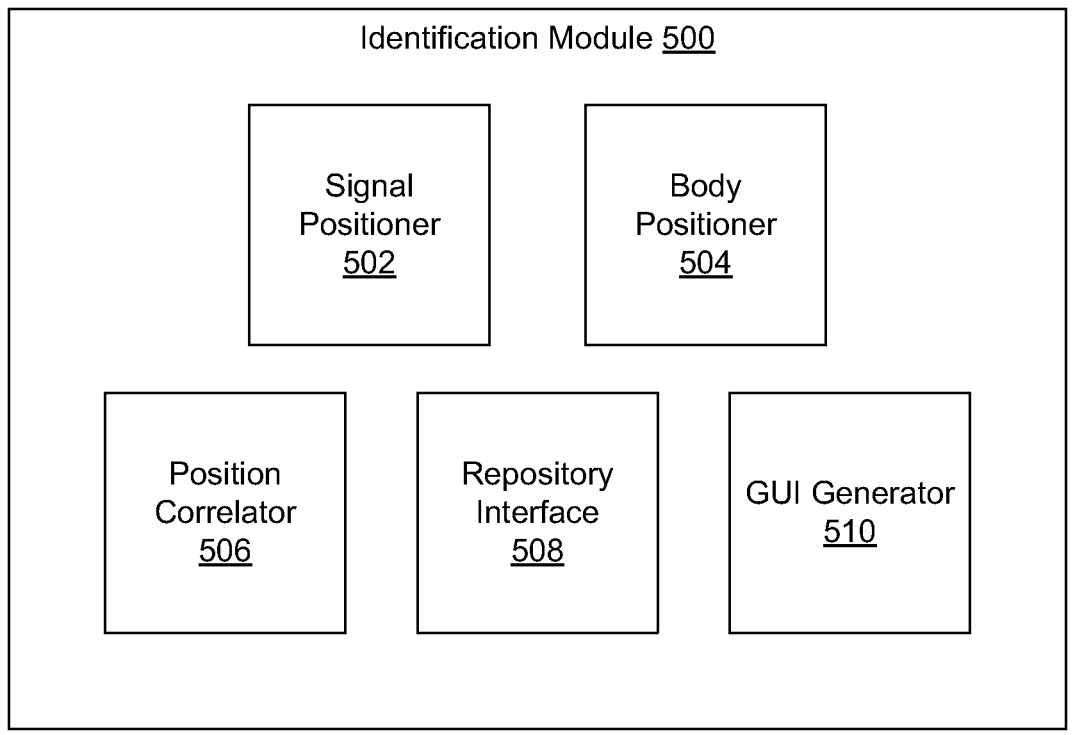
FIG. 5 is a block diagram illustrating an identification module for augmented reality personal identification, according to an embodiment.

FIG. 5 is a block diagram illustrating an identification module for augmented reality personal identification, according to an embodiment of the present invention. In one embodiment, identification module 500 may be representative of one of identification modules 125, 306 or 402, described above. In one embodiment, identification module 500 includes signal positioner 502, body positioner 504, position correlator 506, repository interface 508 and graphic user interface (GUI) generator 510.

In one embodiment, signal positioner 502 may determine a position from which an identification signal originated (i.e., a position of the transmitter 110). In one embodiment, signal positioner 502 may measure the intensity of an identification signal relative to other received signals. The intensity may be indicative of the relative distance of the transmitter from user device 300. In another embodiment, signal positioner 502 may determine the direction from which the signal was received. For example, signal receiver 302 may have multiple antennas, and signal positioner 502 can measure when the identification signal was received at each antenna. For example, signal positioner 502 may be able to triangulate the position of the antenna in bounded a three-dimensional space based on the relative times and intensities of the received signals.

In one embodiment, body positioner 504 may identify distinct bodies and determine their relative positions in the three-dimensional space. For example, body positioner 504 may use image processing techniques on the captured image. In one embodiment, body positioner 504 may use edge detection techniques to identify distinct body shapes in the image. Body positioner 504 can compare the location of these body shapes to fixed points in the image to determine a relative position of each body.

Position correlator 506 can correlate the positions of the transmitters from which the identification signals were received with the positions of the bodies in the captured image. This correlation can associate an identification signal with a body in the image. For example, position correlator 506 may compare the position of a body in the image with each of the positions for the received identification signals.

If there is a match between the two positions, position correlator 506 can associate the body and the signal. In one embodiment, position correlator 506 may establish a threshold for determining when there there is a match, such as a maximum distance between the determined positions. In another embodiment, position correlator 506 may also establish a confidence score for the likelihood that an identification signal came from a detected body. This confidence score may also be used in determining whether to associate the body and the signal.

Repository interface 508 can query tag information repository 422 to determine tag information associated with the received identification signals. In one embodiment, repository interface 508 sends a request, including a unique identifier received in the identification signal, to tag information repository 422. In response, repository interface 508 may receive tag information stored in repository 422 in an entry associated with the unique identifier.

Figure 8:
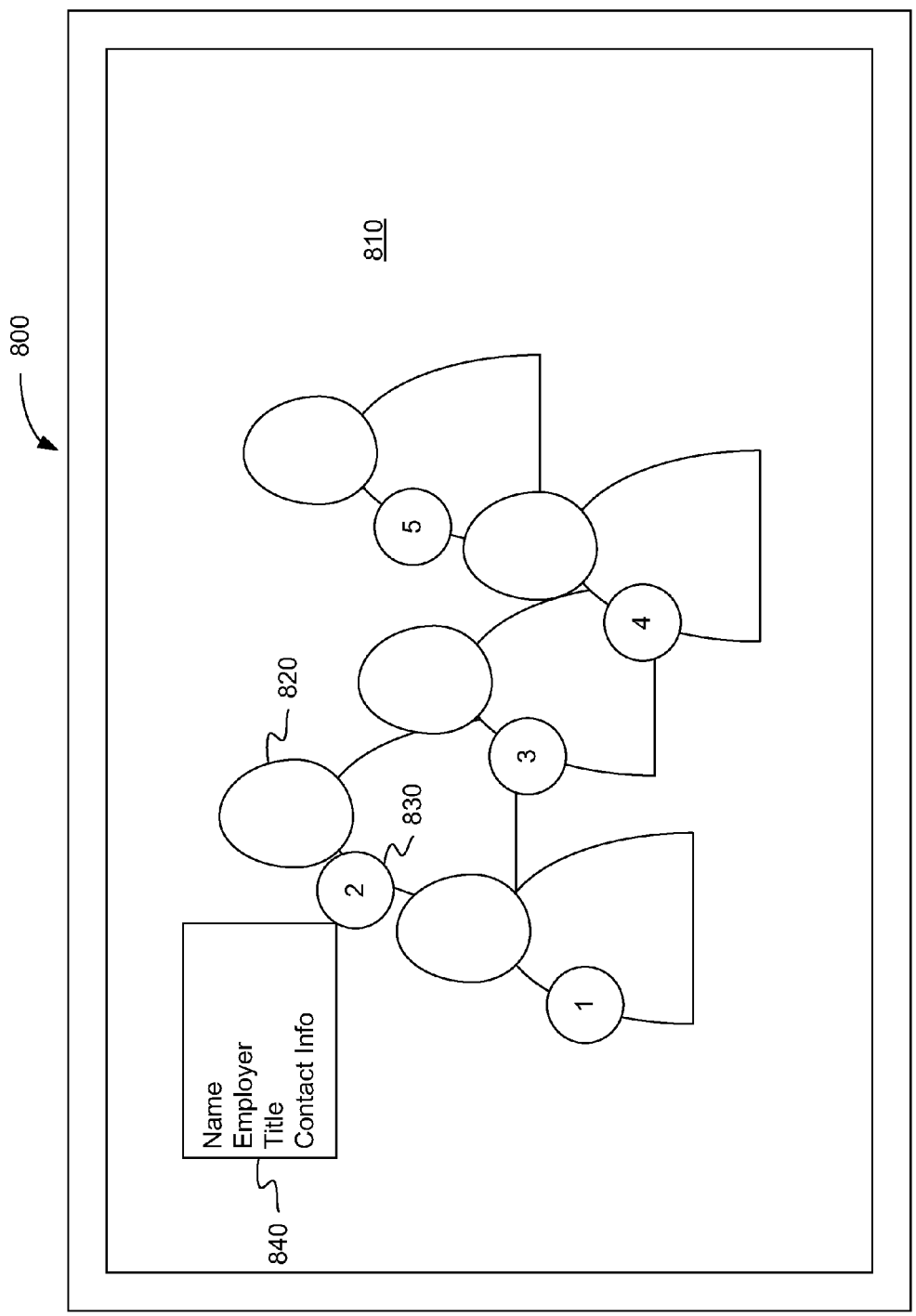
FIG. 8 is a diagram illustrating an augmented reality interface for personal identification, according to an embodiment.

GUI generator 510 can generate a graphical user interface to be overlayed on the captured image of the scene, including the identified individuals. In one embodiment, the GUI includes a series of tags displayed over or adjacent to each body in the image. The tags may display all or a portion of the tag information retrieved from tag information repository 422. In one embodiment, the tags include user selectable icons, that when selected by the user (e.g., by tapping on a touchscreen display), open a window displaying all or a portion of the tag information. An example of one embodiment of the GUI created by GUI generator 510 is illustrated in FIG. 8.

Figure 6:
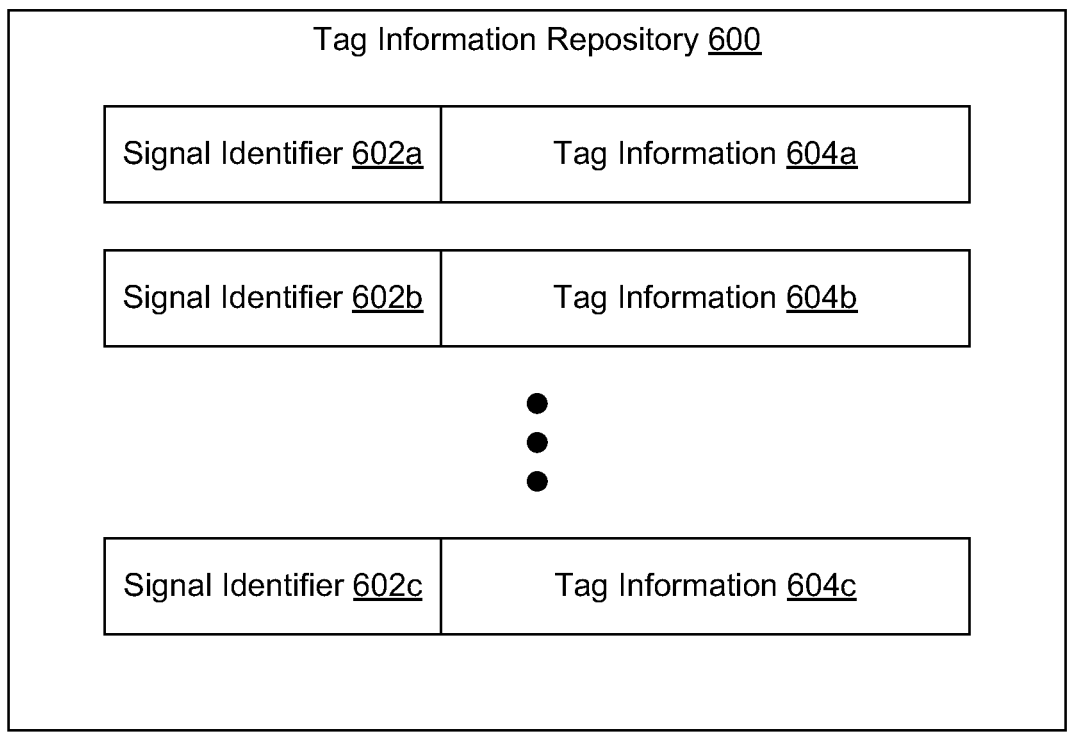
FIG. 6 is a block diagram illustrating a tag information repository, according to an embodiment.

FIG. 6 is a block diagram illustrating a tag information repository, according to an embodiment of the present invention. Tag information repository 600 may be representative of tag information repository 422, discussed above. Tag information repository 600 may be, for example, a database, data store, or other data structure capable of storing tag information. In one embodiment, tag information repository 600 includes a number of entries indexed by a unique signal identifier 602*a-c*. The various signal identifiers 602*a-c* may be received in the identification signal and used to identify the individual associated with the signal. Repository interface 508 may perform, for example, a lookup operation in tag information repository based on the signal identifier. In one embodiment, each unique signal identifier 602*a-c* is associated with a set of tag information 604*a-c*. Tag information 604*a-c* may include information about the associated individual including, for example, name, employer, title, contact information, scheduling information, or other information. In one embodiment, tag information 604*a-c* may be dynamically updated by pulling information from other applications. For example, scheduling information may be updated if there is a change made to the individual's calendar, or contact information may be updated if there is a change made to the individual's address book. In another embodiment, tag information 604*a-c* may be linked to an individual's social media applications, such that there is an update if the individual and the user become connected through social media, or if the individual updates a social media stream or page with new information. In response to the request, repository interface 508 may receive the corresponding tag information 604*a-c*, which may be used to generate the augmented reality user interface.

Figure 7:
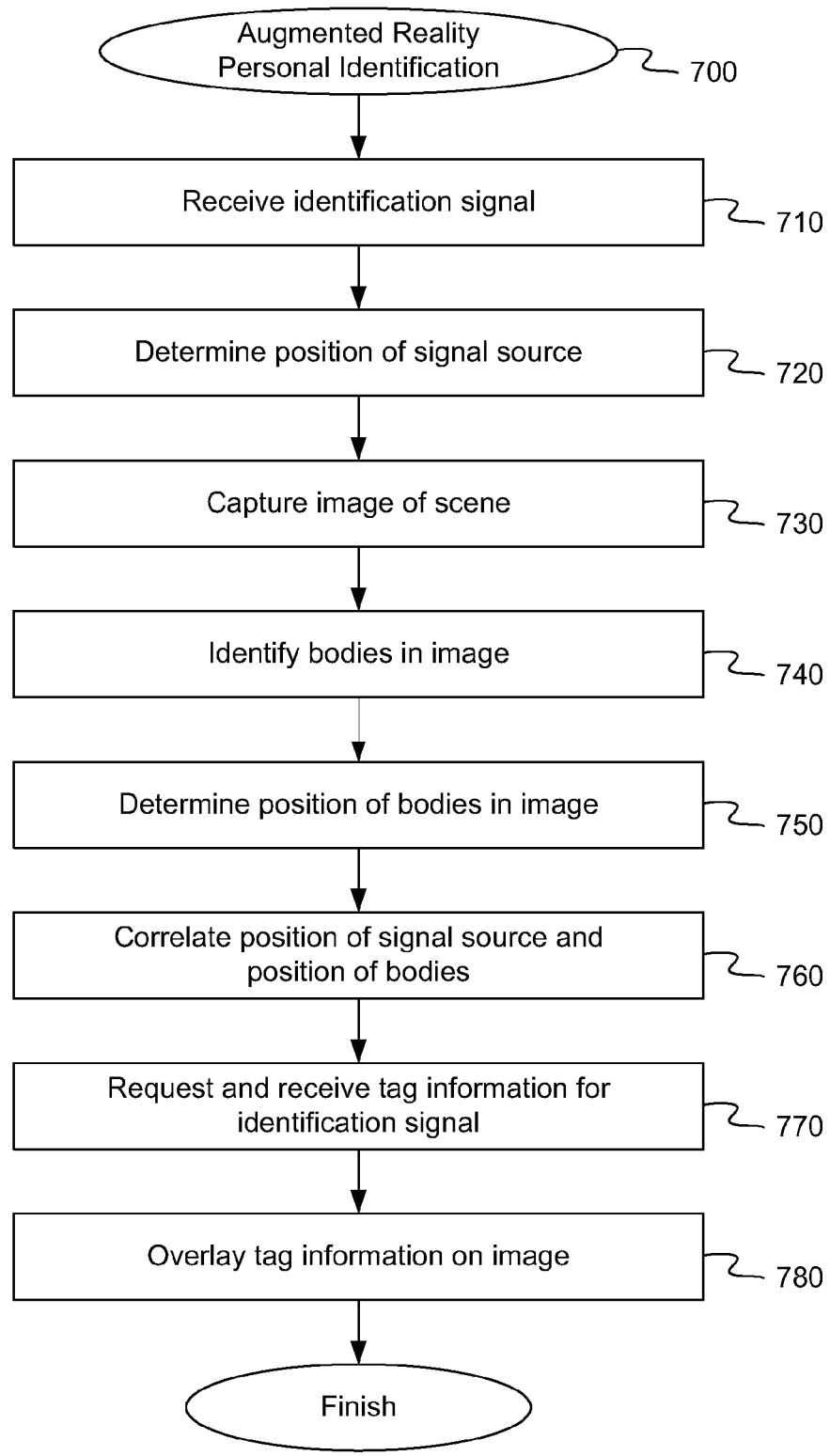
FIG. 7 is a flow diagram illustrating method for augmented reality personal identification, according to an embodiment.

FIG. 7 is a flow diagram illustrating method for augmented reality personal identification, according to an embodiment of the present invention. The method 700 may be performed by processing logic that comprises hardware (e.g., circuitry, dedicated logic, programmable logic, microcode, etc.), software (e.g., instructions run on a processing device to perform hardware simulation), or a combination thereof. The processing logic is configured to identify an individual and generate an augmented reality interface to display identifying information for the individual. In one embodiment, method 700 may be performed by identification module 500, as shown in FIG. 5.

Referring to FIG. 7, at block 710, method 700 receives an identification signal. In one embodiment, the identification signal is received by signal receiver 302 from transmitter 110. Signal receiver 302 may forward a unique signal identifier from the signal to identification module 500. The signal identifier may uniquely identify an individual from whom the signal was sent.

At block 720, method 700 determines a position of the source of the received identification signal. In one embodiment, signal positioner 502 may determine a position from which the identification signal originated (i.e., a position of the transmitter 110). Signal positioner 502 may measure an intensity of the identification signal relative to other received signals to determine the relative distance of the transmitter from user device 300. For example, signal positioner 502 may be able to triangulate the position of the transmitter 110 in a bounded a three-dimensional space.

At block 730, method 700 captures an image of the scene including the individuals. In one embodiment, the captured image is captured by camera 304 and forwarded to identification module 500. The image may include a number a bodies belonging to the individuals associated with the received identification signals.

At block 740, method 700 identifies the bodies in the image. In one embodiment, body positioner 504 may identify distinct bodies using image processing techniques on the captured image. In one embodiment, body positioner 504 may use edge detection techniques to identify distinct body shapes in the image. At block 750, method 700 determines a position of the bodies in the image. In one embodiment, body positioner 504 can compare the location of these body shapes to fixed points in the image to determine a relative position of each body.

At block 760, method 700 correlates the position of the identification signal source and the position of the identified bodies in the image. In one embodiment, position correlator 506 can correlate the positions of the transmitters from which the identification signals were received with the positions of the bodies in the captured image. This correlation can associate an identification signal with a body in the image. For example, position correlator 506 may compare the position of a body in the image with each of the positions for the received identification signals. If there is a match between the two positions, position correlator 506 can associate the body and the signal.

At block 770, method 700 requests and receives tag information corresponding to the received identification signal. In one embodiment, repository interface 508 can query tag information repository 422 to determine tag information associated with the received identification signals. In one embodiment, repository interface 508 sends a request, including a unique identifier received in the identification signal, to tag information repository 422. In response, repository interface may receive tag information stored in repository 422 in an entry associated with the unique identifier.

At block 780, method 700 overlays the tag information on the captured image. In one embodiment, GUI generator 510 can generate a graphical user interface to be overlayed on the captured image of the scene, including the identified individuals. In one embodiment, the GUI includes a series of tags displayed over or adjacent to each body in the image. The tags may display all or a portion of the tag information retrieved from tag information repository 422. In one embodiment, the tags include user selectable icons, that when selected by the user (e.g., by tapping on a touchscreen display), open a window displaying all or a portion of the tag information.

FIG. 8 is a diagram illustrating an augmented reality interface for personal identification, according to an embodiment of the present invention. In one embodiment, user device 800 (which may be a representation of user device 300), displays an augmented reality image 810. The underlying image may be an image captured by camera 304. Augmented reality image 800 may include a number of bodies, such as body 820, representing various individuals. Augmented reality image 800 may also include a number of identification tags, such as identification tag 830, corresponding to each of the bodies. In one embodiment, the identification tag 830 appears as a user selectable icon adjacent to body 820. When selected by the user (e.g., by tapping a touchscreen display), a tag information window 840 may be displayed. The tag information window may display the tag information from repository 600, such as, name, employer, title, contact information, and/or other information. In another embodiment, rather than a user selectable icon, all or a portion of the tag information may be displayed over or adjacent to body 820, without requiring any user interaction (e.g., selection of the icon).

In one embodiment, augmented reality image 810 is a still image of the scene captured at a previous moment in time. In other embodiments, however, augmented reality image 810 is a live image of the scene. As the user moves user device 800 or repositions the camera to view a different portion of the scene, augmented reality image 810 may be updated. In one embodiment, the identification tags 830 and/or tag information windows 840 are updated in real-time or close to real-time as individuals leave or enter the view of augmented reality image 810. For example, if a new individual enters the view, an identification tag 830 may be displayed for the individual in real-time. Similarly, if an individual leaves the view, the corresponding identification tag 830 may be removed.

Figure 9:
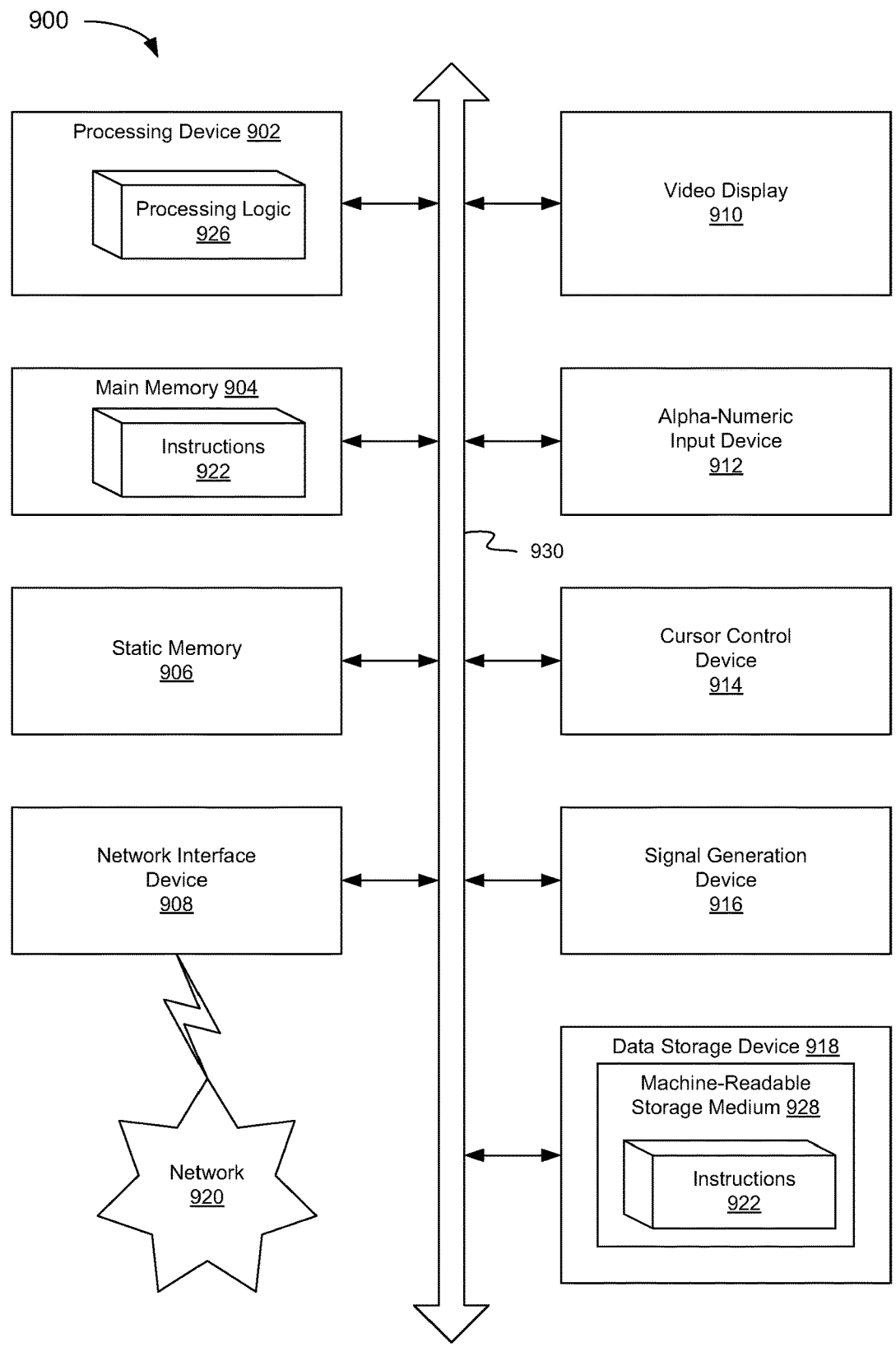
FIG. 9 is a block diagram illustrating a computer system, according to an embodiment.

FIG. 9 illustrates a diagrammatic representation of a machine in the exemplary form of a computer system 900 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 900 may be representative of a computing device, such as user device 120 or server 130, running identification module 125.

The exemplary computer system 900 includes a processing device 902, a main memory 904 (e.g., read-only memory (ROM), flash memory, dynamic random access memory (DRAM) (such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute processing logic 926 for performing the operations and steps discussed herein.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The data storage device 918 may include a machine-accessible storage medium 928, on which is stored one or more set of instructions 922 (e.g., software) embodying any one or more of the methodologies of functions described herein. The instructions 922 may also reside, completely or at least partially, within the main memory 904 and/or within the processing device 902 during execution thereof by the computer system 900; the main memory 904 and the processing device 902 also constituting machine-accessible storage media. The instructions 922 may further be transmitted or received over a network 920 via the network interface device 908.

The machine-readable storage medium 928 may also be used to store instructions for augmented reality personal identification, as described herein. While the machine-readable storage medium 928 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A method comprising:
capturing an image of a body;
receiving a unique identification signal comprising a unique identifier to identify an individual associated with the body in the captured image;
determining, by a processing device of a user device and from a tag information repository, tag information associated with the individual by accessing an entry in the tag information repository indexed by the unique identifier from the unique identification signal;
determining, by the user device, a position of the individual associated with the unique identification signal by triangulating a source of the unique identification signal;
correlating the position of the individual associated with the unique identification signal with a position of the body in the captured image, the correlating to associate the body in the captured image with the individual associated with the unique identification signal in view of a confidence score associated with a first distance between the body in the captured image and the source of the unique identification signal;
determining a second distance from the user device to the unique identification signal associated with the individual in view of an intensity of the unique identification signal;
displaying the tag information overlayed on the image of the body; and
displaying the position of the individual associated with the unique identification signal.

2. The method of claim 1, wherein the identification signal is received from a transmitter carried by the individual associated with the body in the captured image.

3. The method of claim 1, wherein the image comprises a live image of the body.

4. The method of claim 1, further comprising:
determining the position of the body in view of the captured image.

5. The method of claim 1, wherein displaying the tag information overlayed on the image of the body comprises updating the tag information in real-time.

6. The method of claim 1, wherein displaying the tag information overlayed on the image of the body comprises displaying a user selectable icon adjacent to the body in the image.

7. A system comprising:
a memory; and
a processing device, operatively coupled to the memory, the processing device to:
capture an image of a body;
receive a unique identification signal comprising a unique identifier to identify an individual associated with the body in the captured image;
determine, by a user device from a tag information repository, tag information associated with the individual by accessing an entry in the tag information repository indexed by the unique identifier from the unique identification signal;
determine a position of the individual associated with the unique identification signal that identifies the individual by triangulating a source of the unique identification signal;
correlate the position of the individual associated with the unique identification signal with a position of the body in the captured image, the correlating to associate the body in the captured image with the individual associated with the unique identification signal in view of confidence score associated with a first distance between the body in the captured image and the source of the unique identification signal;
determine a second distance from the user device to the unique identification signal associated with the individual in view of an intensity of the unique identification signal;
display the tag information overlayed on the image of the body; and
display the position of the individual associated with the unique identification signal that identifies the individual.

8. The system of claim 7, wherein the identification signal is received from a transmitter carried by the individual associated with the body in the captured image.

9. The system of claim 7, wherein the image comprises a live image of the body.

10. The system of claim 7, the processing device further to:
determine the position of the body in view of the captured image.

11. The system of claim 7, wherein to display the tag information, the processing device is to update the tag information in real-time.

12. The system of claim 7, wherein to display the tag information, the processing device is to display a user selectable icon adjacent to the body in the image.

13. A non-transitory machine-readable storage medium storing instructions which, when executed, cause a processing device to:
capture an image of a body;
receive a unique identification signal comprising a unique identifier to identify an individual associated with the body in the captured image;
determine, by the processing device of a user device and from a tag information repository, tag information associated with the individual by accessing an entry in the tag information repository indexed by the unique identifier from the unique identification signal;
determine a position of the individual associated with the unique identification signal by triangulating a source of the unique identification signal;
correlate the position of the individual associated with the unique identification signal with a position of the body in the captured image, the correlating to associate the body in the captured image with the individual associated with the unique identification signal in view of a confidence score associated with a first distance between the body in the captured image and the source of the unique identification signal;
determine a second distance from the user device to the unique identification signal associated with the individual in view of an intensity of the unique identification signal;

display the tag information overlayed on the image of the body; and display the position of the individual associated with the unique identification signal.

14. The non-transitory machine-readable storage medium of claim 13, wherein the identification signal is received from a transmitter carried by the individual.

15. The non-transitory machine-readable storage medium of claim 13, wherein the image comprises a live image of the body.

16. The non-transitory machine-readable storage medium of claim 13, the processing device further to:

determine the position of the body in view of the captured image.

17. The non-transitory machine-readable storage medium of claim 13, wherein to display the tag information overlayed on the image of the body the instructions to cause the processing device to update the tag information in real-time.

18. The non-transitory machine-readable storage medium of claim 13, wherein to display the tag information overlayed on the image of the body the instructions to cause the processing device to display a user selectable icon adjacent to the body in the image.

\* \* \* \* \*